United States Patent
Muharemovic et al.

(10) Patent No.: US 8,107,547 B2
(45) Date of Patent: Jan. 31, 2012

(54) RECEIVERS FOR EMBEDDED ACK/NAK IN CQI REFERENCE SIGNALS IN WIRELESS NETWORKS

(75) Inventors: Tarik Muharemovic, Dallas, TX (US); Zukang Shen, Richardson, TX (US); Eko Nugroho Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 623 days.

(21) Appl. No.: 12/272,503

(22) Filed: Nov. 17, 2008

(65) Prior Publication Data

US 2010/0124291 A1    May 20, 2010

(51) Int. Cl.
*H04K 1/10*    (2006.01)
(52) U.S. Cl. ....................................................... 375/260
(58) Field of Classification Search .................. 370/312, 370/349
See application file for complete search history.

(56) References Cited

U.S. PATENT DOCUMENTS

| | | | |
|---|---|---|---|
| 2005/0047387 A1* | 3/2005 | Frederiksen et al. ......... | 370/349 |
| 2006/0233222 A1* | 10/2006 | Reial et al. ................... | 375/147 |
| 2009/0003420 A1* | 1/2009 | Wu et al. ....................... | 375/220 |
| 2009/0168686 A1* | 7/2009 | Love et al. .................... | 370/312 |
| 2010/0067590 A1* | 3/2010 | Walton et al. ................. | 375/260 |

OTHER PUBLICATIONS

3GPP, "3rd Generation Partnership Project; Technical Specification Group Radio Access Network; Evolved Universal Terrestrial Radio Access (E-UTRA); Physical Channels and Modulation", Release 8, V8.4.0, Valbonne, France, Sep. 2008, pp. 1-80.
3GPP, "Embedding ACK/NAK in CQI Reference Signals and Receiver Structures", 3GPP TSG RAN WG1 #51bis, R1-080190, Agenda Item: 6.1.4, Sevilla, Spain, Jan. 14-18, 2008, pp. 1-7.
Texas Instruments, "Transmission of ACK/NACK Bits and their Embedding in the CQI Reference Signal", U.S. Appl. No. 12/183,242, filed Jul. 31, 2008, pp. 1-36.

* cited by examiner

*Primary Examiner* — David C. Payne
*Assistant Examiner* — Leon-Viet Nguyen
(74) *Attorney, Agent, or Firm* — John R. Pessetto; W. James Brady; Frederick J. Telecky, Jr.

(57) ABSTRACT

Within a wireless network, uplink control information (UCI) transmitted by user equipment is received by a base station. The UCI includes a least two elements, a first set of symbols produced using a first information element and a second set of symbols produced using a second information element. At least a first metric is produced using the first set and the second set of received symbols. The first information element may then be detected using the first metric.

8 Claims, 6 Drawing Sheets

RECEIVERS FOR EMBEDDED ACK/NAK IN CQI REFERENCE SIGNALS IN WIRELESS NETWORKS

FIELD OF THE INVENTION

This invention generally relates to wireless communication, and in particular to providing and decoding feedback in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

To support dynamic scheduling and multiple-input multiple-output (MIMO) transmission in downlink (DL), several control information feedback bits must be transmitted in uplink. For example, MIMO related feedback information includes: Index of a selected precoding matrix (PMI); transmission rank, which is the number of spatial transmission layers; and supportable modulation and coding schemes (MCS).

Control information feedback bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACK-NAK or just simply ACK, or any other equivalent term. This uplink control information is typically transmitted using the physical uplink control channel (PUCCH), as defined by the 3GPP working groups (WG), for evolved universal terrestrial radio access (EUTRA). The EUTRA is sometimes referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are sometimes found at the two extreme edges of the uplink frequency spectrum. In contrast, frequency resources which are used for PUSCH are typically in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (TS36.211, Release 8)."

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

This document discusses reception of simultaneous ACK/NAK with CQI in uplink. A slot in the physical uplink control channel (PUCCH) typically includes two reference signal (RS) symbols and five data symbols. A subframe comprises two slots. Since the contents of an RS are known by both the transmitter and the receiver, the receiver can demodulate both RS and determine channel estimates based on the known contents of the two received RS. In this manner, the receiver can then demodulate and decode the data symbols using the channel estimates for that slot. Since channel conditions in a cellular network may vary rapidly due to movement of the UE within the cell, it is important to determine channel estimates for each slot as they are received. Having two RS in each slot, one near the beginning and one near the end, improves the channel estimate over the time period of the slot.

Various schemes may be employed to reduce the amount resources required for uplink control information that needs to be transmitted from mobile user equipment (UE) to a base station (NodeB) within a cell. One scheme involves modulating one of the CQI RS symbols with a value to represent the ACK/NAK feedback. Various encoding schemes may be used to embed an ACK/NAK value in the CQI RS. U.S. patent application Ser. No. 12/183,242, entitled "Transmission of ACK/NACK Bits and their Embedding in the CQI Reference Signal" discloses several such schemes and is incorporated by reference herein.

When the RS is modulated with the ACK/NAK, it loses its quality of being a predetermined quantity to the receiver, since its contents vary based on the modulated ACK/NAK value. Techniques will now be described to overcome the loss of pre-determination of the second RS symbol and to thereby improve channel estimates and subframe block error rate (BLER). As will be described in more detail below, in one embodiment, the un-modulated RS and the set of CQI symbols may be used with assumed values of ACK/NAK to produce a set of metrics that allow determination of the correct value of ACKNAK in the modulated RS; then the demodulated RS may be recovered and the two RS are then used to demodulate the CQI symbols. Conversely, the un-modulated RS and the ACKNAK modulated RS symbol may be used with assumed values of the CQI symbols to produce a set of metrics that allow determination of the correct value of the CQI symbols; then the demodulated value of the modulated RS may be recovered and the used to demodulate the ACK-NAK symbol.

Figure 1:
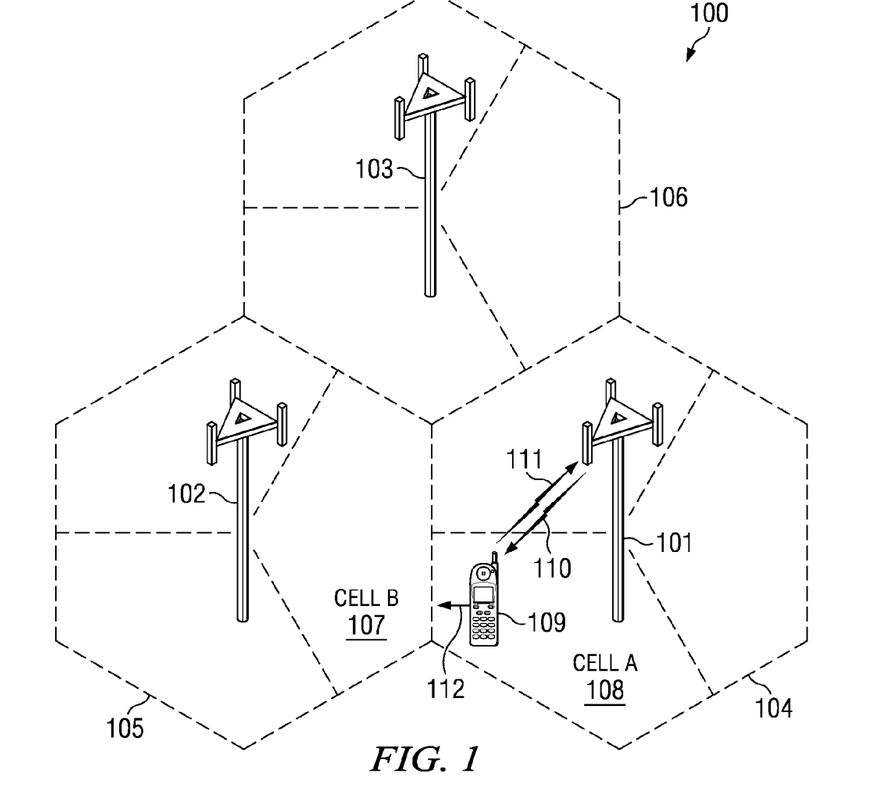
FIG. 1 is a pictorial of an illustrative telecommunications network that employs an embodiment of feedback modulated on an uplink reference signal in the physical uplink control channel (PUCCH)

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. Because UE 109 is synchronized with base station 101, UE 109 must employ non-synchronized random access to initiate handover to base station 102.

A UE in a cell may be stationary such as within a home or office, or may be moving while a user is walking or riding in a vehicle. UE 109 moves within cell 108 with a velocity 112 relative to base station 102.

Channel quality indicator (CQI) needs to be fed back in uplink (UL) to support dynamic scheduling and multiple-input-multiple-output (MIMO) transmission on downlink (DL). In 3GPP EUTRA, if a UE (user equipment) has no uplink data transmission, its CQI is transmitted on a dedicated UL control channel (i.e. PUCCH). To support dynamic scheduling and multiple-input multiple-output transmission in downlink (DL), several control signaling bits must be fed back in uplink (UL). For example, MIMO related feedback information includes: index of a selected precoding matrix (PMI); transmission rank, which is the number of spatial transmission layers; and supportable modulation and coding schemes (MCS).

In this document, PMI and MCS will generally be referred to as the channel quality indicator (CQI). Note that the feedback frequency and time granularity of MIMO related information can be UE (user equipment) specific. Further, the rank feedback time granularity (reporting interval) can be larger than CQI. Thus, it is unnecessary to transmit rank information every time CQI is fed back. On the other hand, the rank information has to be received with high reliability, because rank information determines the number of information bits contained in CQI. In other words, CQI is generated using the value of transmission rank.

Rank and CQI can be jointly coded and transmitted in UL. However, since rank information determines the length of the CQI information bits and consequently the coding scheme, blind decoding is necessary for joint rank and CQI coding, which may not provide satisfactory performance. This document discusses simultaneous ACK/NAK transmission with CQI in uplink, assuming the CQI size is known at NodeB. In other words, it is assumed that Rank transmission is separate from CQI and the Rank information is always correctly received by NodeB.

Receivers within base station 101 receive the CQI feedback transmission instances from UE within coverage area 104, for example. Receiver structures for this purpose will be described in more detail below.

Table 1 lists the number of CQI bits and ACK/NAK bits that may be used in this embodiment. Table 2 lists the coding scheme for CQI. Punctured tailing biting convolutional coding is assumed as the coding scheme for CQI bits, with generator polynomial of [G0=133, G1=171] (Octal) for rate ½. Table 3 lists other parameters of link level operation in this embodiment.

TABLE 1

| Number of CQI, Rank, and ACK/NAK Bits | | | | |
|---|---|---|---|---|
| | 2-Tx Antennas | | 4-Tx Antennas | |
| | Rank = 1 | Rank = 2 | Rank = 1 | Rank > 1 |
| Number of CQI Bits | 8 | 10 | 9 | 12 |
| Number of ACK/NAK Bits | | 1 | | 2 |

TABLE 2

CQI Coding Schemes

|  |  | ACK/NAK in CQI RS | Joint ACK/NAK and CQI |
|---|---|---|---|
| 1 Rank Bit | Rank = 1 | R = ⅓, (8, 20) | R = ⅓, (9, 20) |
|  | Rank = 2 | R = ½, (10, 20) | R = ½, (11, 20) |
| 2 Rank Bits | Rank = 1 | R = ⅓, (9, 20) | R = ½, (11, 20) |
|  | Rank > 1 | R = ½, (12, 20) | R = ½, (14, 20) |

TABLE 3

Link Level Parameter Assumptions

| Parameters | Assumptions |
|---|---|
| Numerology | 5 MHz @ 2.0 GHz |
| Resource Block | 180 kHz (15 kHz × 12) |
| Frequency Hopping Subframes | 2 |
| Channel Model | SC |
| Number of Receive Antennas | 2 for 1 Rank Bit; 4 for 2 Rank bits |
| Number of Transmit Antennas | 1 |

In general, the ACK/NAK is produced by a UE in response to receiving at least one data packet. After processing the data packet, the UE provides feedback to either acknowledge (ACK) receipt of a good packet or to not acknowledge (NAK) thereby indicating a defective packet was received. Condition of the data packet may be determined by performing a circular redundancy check (CRC) on the contents of the data packet. CRC may also be referred to as cyclic redundancy check, or other equivalent terms.

The UE determines channel quality information by processing reference signals received on the downlink channel from the base station using known techniques. Channel quality information may also be referred to as channel quality index or other equivalent terms.

Figure 2:
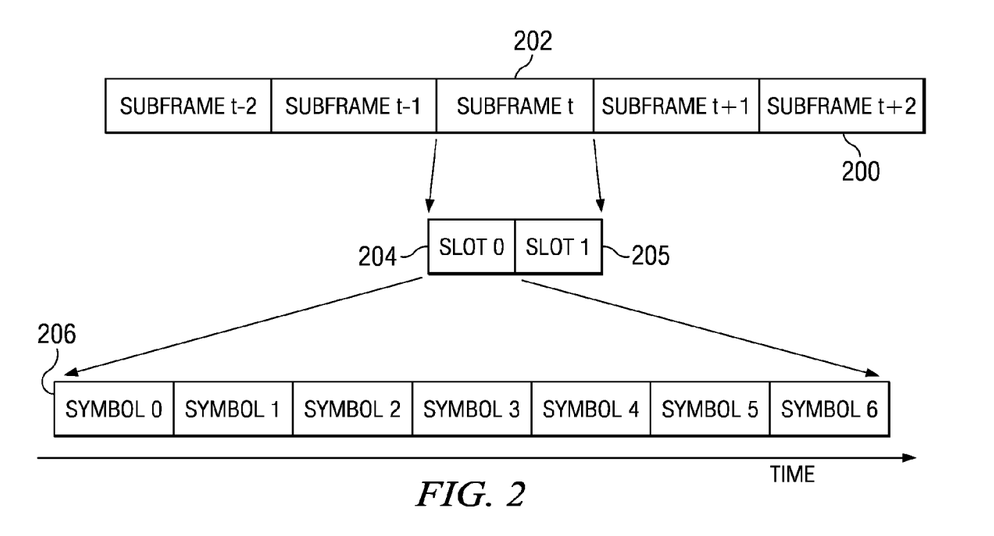
FIG. 2 is an example frame structure used in the PUCCH of FIG. 1.

FIG. 2 is an example frame structure 200 used in the PUCCH of FIG. 1. Each frame 200 contains several subframes, as indicated generally at 202. In turn, each subframe 202 contains two slots 204, 205. Each slot contains a number of information carrying symbols, generally indicated at 206. A cyclic prefix (CP) field is also appended to each symbol in order to improve reception integrity. In the current E-UTRA standard, each slot contains seven symbols 206 if a normal CP length is used or six symbols 206 if an extended CP length is used. Other embodiments of the invention may provide other frame structures than the exemplary frame structure illustrated in FIG. 2. With QPSK modulation, 20 coded CQI bits are available per UE within one subframe. Further, with CDM (code division multiplexing) through cyclic shifted CAZAC-like sequences, multiple CQI UEs can be multiplexed on one resource block (RB). Ideally, 12 CQI UEs can be supported within one RB. However, due to spillover between consecutive cyclic shifts, it is recommended that not all 12 cyclic shifts are utilized.

Figure 3:
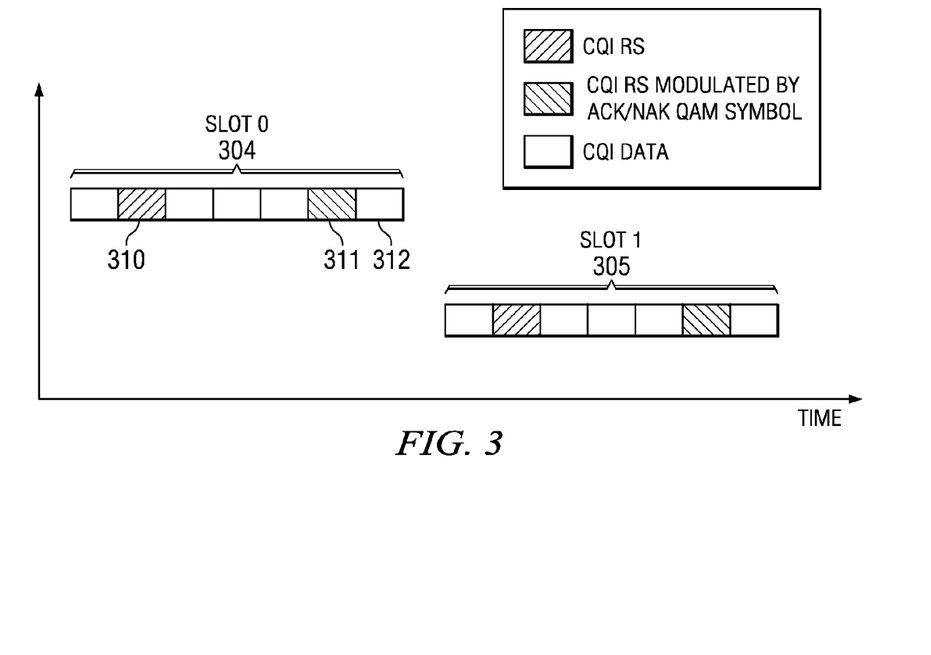
FIG. 3 is a time-frequency plot illustrating placement of separate ACK/NAK and CQI symbols, where ACK/NAK is placed in one of the CQI reference symbols in the frame structure of FIG. 2.

FIG. 3 is a time-frequency plot illustrating placement of separate ACK/NAK and CQI symbols, where ACK/NAK is placed in one of the CQI reference symbols in the frame structure of FIG. 2. Two reference symbols (RS) 310, 311 are included within each slot. In this illustration, the second RS 311 is modulated to embed the ACK/NAK, however in another embodiment the order may be reversed. As discussed above, FIG. 3 illustrates a subframe with two slots 304, 305 in the normal CP case. In this embodiment, both slots 304 and 305 carry the ACKNAK indication embedded in a CQI reference signal, which is repeated in both slots. CQI bits are coded separately from the ACKNAK and placed in data symbols, as indicated generally at 312. For an extended CP, only a single RS may be provided in each slot in which ACKNAK may be embedded. In another embodiment of extended CP, a data symbol may be dropped from each slot in order to retain two RS.

Figure 4:
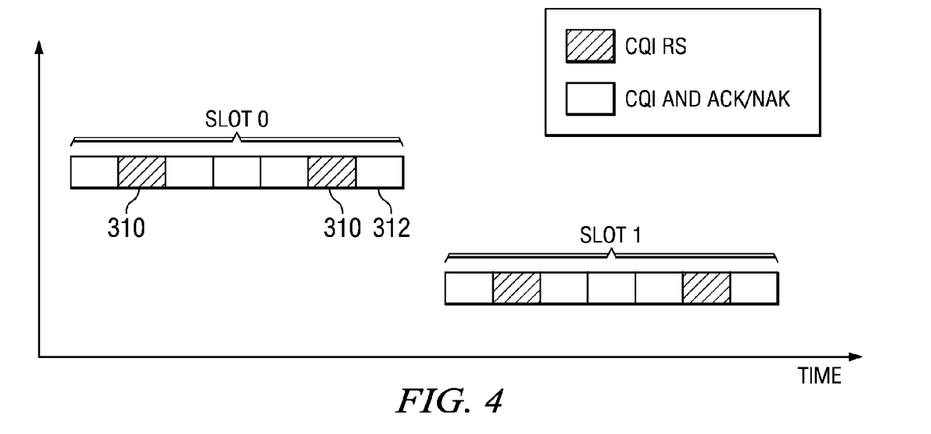
FIG. 4 is a time-frequency plot illustrating placement of joint ACK/NAK and CQI symbols.

FIG. 4 is a time-frequency plot illustrating placement of joint ACK/NAK and CQI symbols. In this case, no information is embedded in any of the CQI reference signals 310 of either slot. ACK/NAK bits and CQI bits are jointed coded and placed in data symbols, as indicated generally at 312. In this case, both RS are available for channel estimation for use in demodulation of the data symbols; however, since the ACK-NAK information is jointly encoded with the CQI data, higher order modulation may be required.

Figure 5:
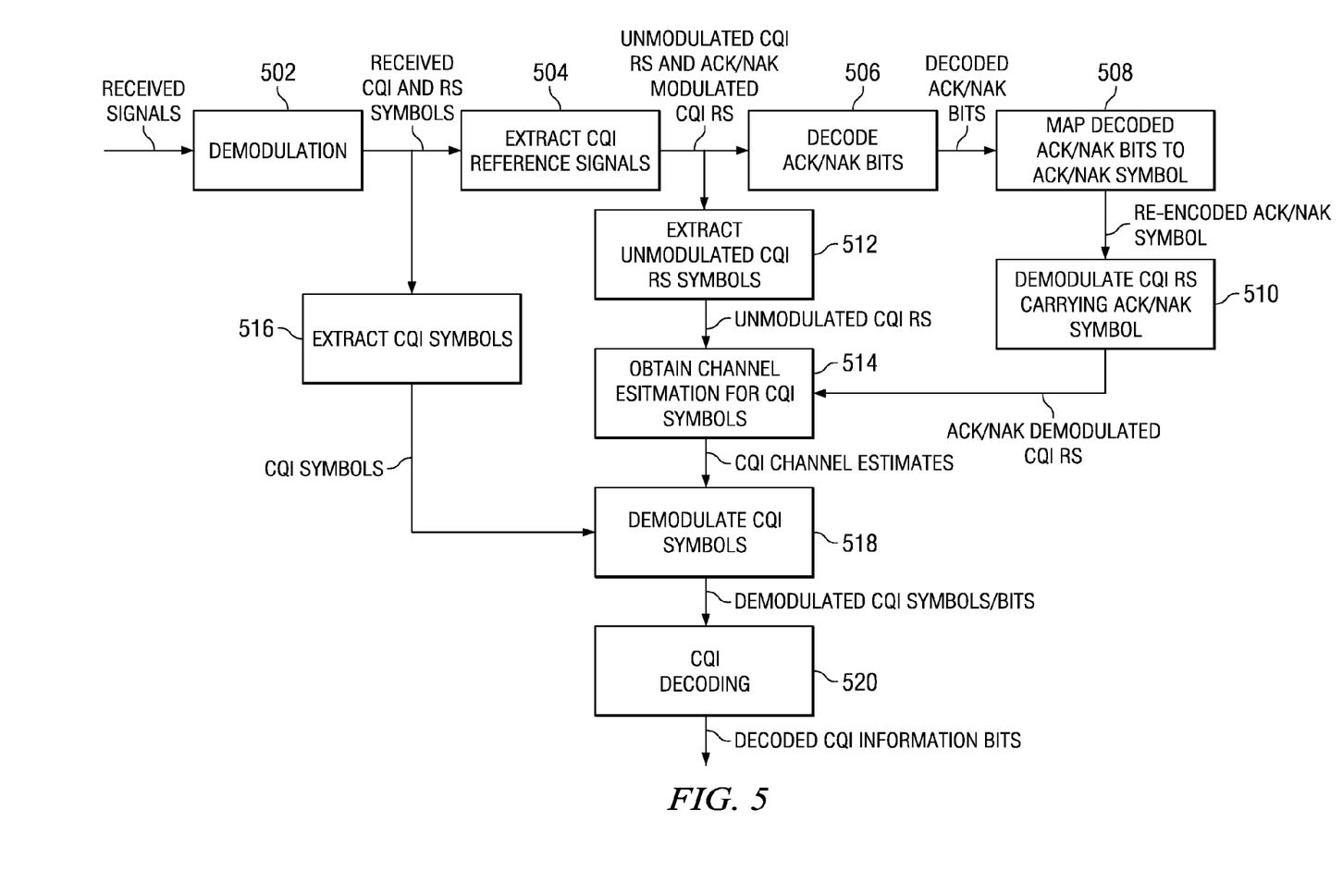
FIG. 5 is a block diagram illustrating ACK/NAK and CQI decoding for ACK/NAK embedded in CQI RS for low to medium speed environments.

FIG. 5 is a block diagram illustrating ACK/NAK and CQI decoding for ACK/NAK embedded in CQI RS for low to medium speed environments. This corresponds to the structure illustrated in FIG. 3. In a low to medium speed environment, the receiver which is located in the NodeB serving the cell can decode the ACK/NAK bits received from a UE in the cell by first using the CQI reference signals. The decoded ACK/NAK bits can then be used to further improve the channel estimation for CQI demodulation.

Demodulation block 502 processes the received signals for each subframe, also referred to herein as a transmission instance, to obtain the received CQI reference signals (RS) and CQI data OFDM (orthogonal frequency division multiplex) symbols using known techniques. Referring again to FIG. 3, CQI RS 311 is modulated to carry the ACK/NAK symbol (BPSK or QPSK), while RS 310 is an unmodulated CQI RS. Extraction block 504 extracts the unmodulated CQI reference signal and the ACK/NAK modulated CQI references signal using known techniques. The ACK/NAK bit(s) are decoded by block 506 using the extracted ACK/NAK modulated CQI RS and the un-modulated CQI RS, which provides a channel estimate for coherent decoding of the ACK/NAK bits using known techniques. The decoded ACK/NAK bits are then re-encoded or re-mapped to a BPSK (binary phase shift keying) or QPSK (quaternary phase shift keying) symbol in block 508 to form a re-encoded ACK/NAK symbol, which is used to demodulate the ACK/NAK CQI RS in block 510 to form an ACK/NAK demodulated CQI RS.

Extraction block 512 extracts unmodulated CQI RS symbols using known techniques. After that, all available CQI RS are used to provide channel estimates for all CQI data symbols channel estimation block 514. This includes the unmodulated CQI RS extracted by block 512 and the demodulated CQI RS from block 510 which originally carried ACK/NAK.

Extraction block 516 extracts the CQI data symbols from the received subframes using known techniques. The received CQI data symbols are then demodulated in demodulation block 518 using the CQI channel estimates provided by block 514 to form demodulated CQI symbols. Decoder block 520 then decodes the demodulated CQI symbols using known techniques to obtain the CQI information bits.

For ACK/NAK embedded in CQI RS in high speed environment, the receiver structure in FIG. 5 is still applicable. However, due to channel variations within a slot, the ACK/NAK detection performance suffers from error floors. Consequently, the erroneously decoded ACK/NAK bits may lead to an erroneous channel estimate for CQI, which impacts the CQI performance. In the following, an alternative receiver structure for ACK/NAK in CQI RS is presented for high speed environment.

Figure 6:
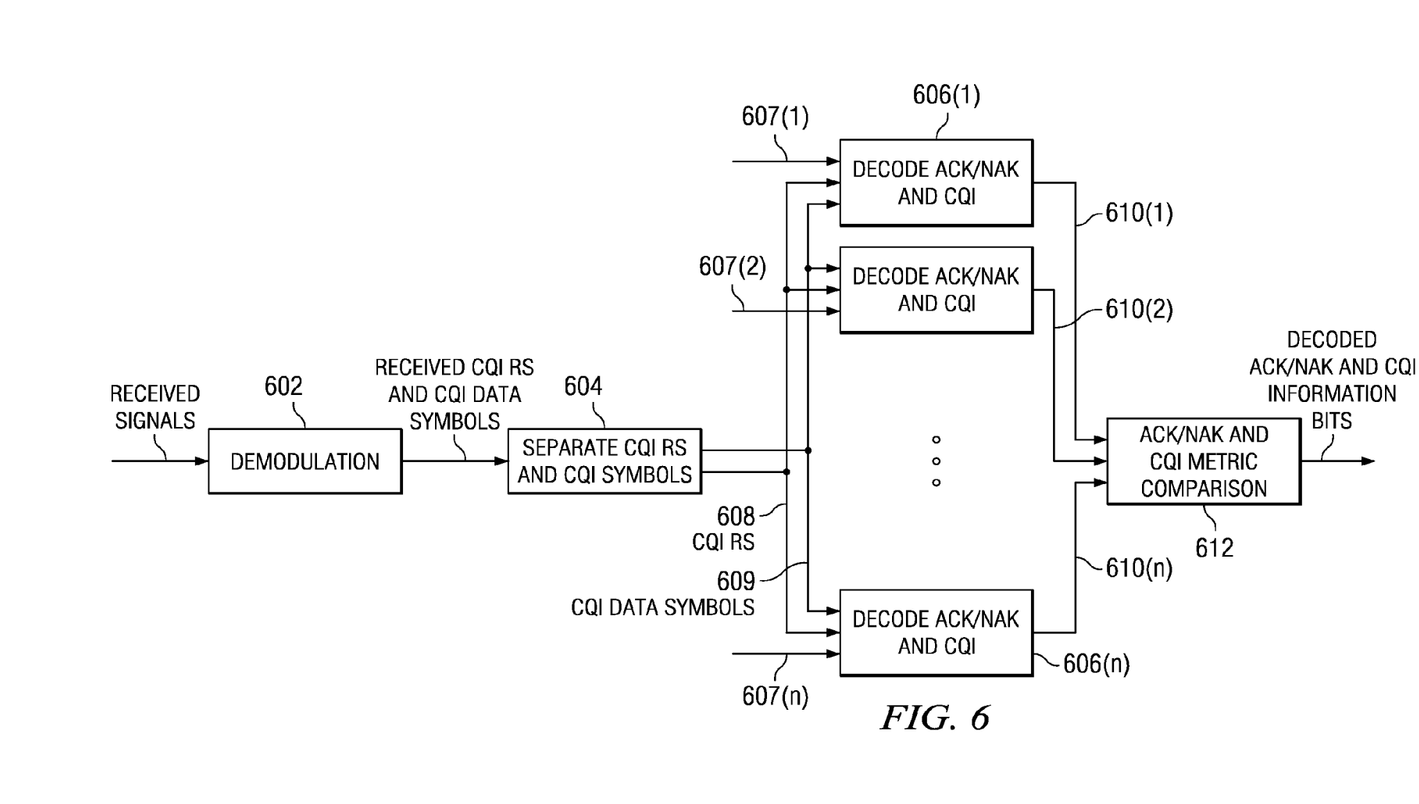
FIG. 6 is a block diagram illustrating ACK/NAK and CQI decoding for ACK/NAK embedded in CQI RS for high speed environments.

FIG. 6 shows an alternative block diagram of a receiver structure for separate ACK/NAK transmission where ACK/NAK is embedded in CQI RS corresponding to the structure illustrated in FIG. 3. The received signals are processed by the demodulation block 602 using known techniques to obtain the CQI RS and CQI data symbols. Separator block 604 separates the CQI RS symbols 608 and the CQI data symbols 609 using known techniques.

A Blind decoding is performed on the obtained CQI RS and CQI data OFDM symbols using a set of decoders 606(1)-606(n). Blind decoding is performed with respect to all of the possible ACK/NAK bits or symbols. Each copy of the decode ACK/NAK and CQI block 606(1)-606(n) represent the blind decoding procedure and produces a possible decoded ACK/NAK, a possible CQ and a metric, at each output 610(1)-610(n). Three inputs can exist for each decoder block:

(1) CQI RS 608, which includes the un-modulated CQI RS and the ACK/NAK modulated CQI RS, (2) CQI data symbols 609, and (3) an assumed ACK/NAK symbol 607(n)

Figure 7:
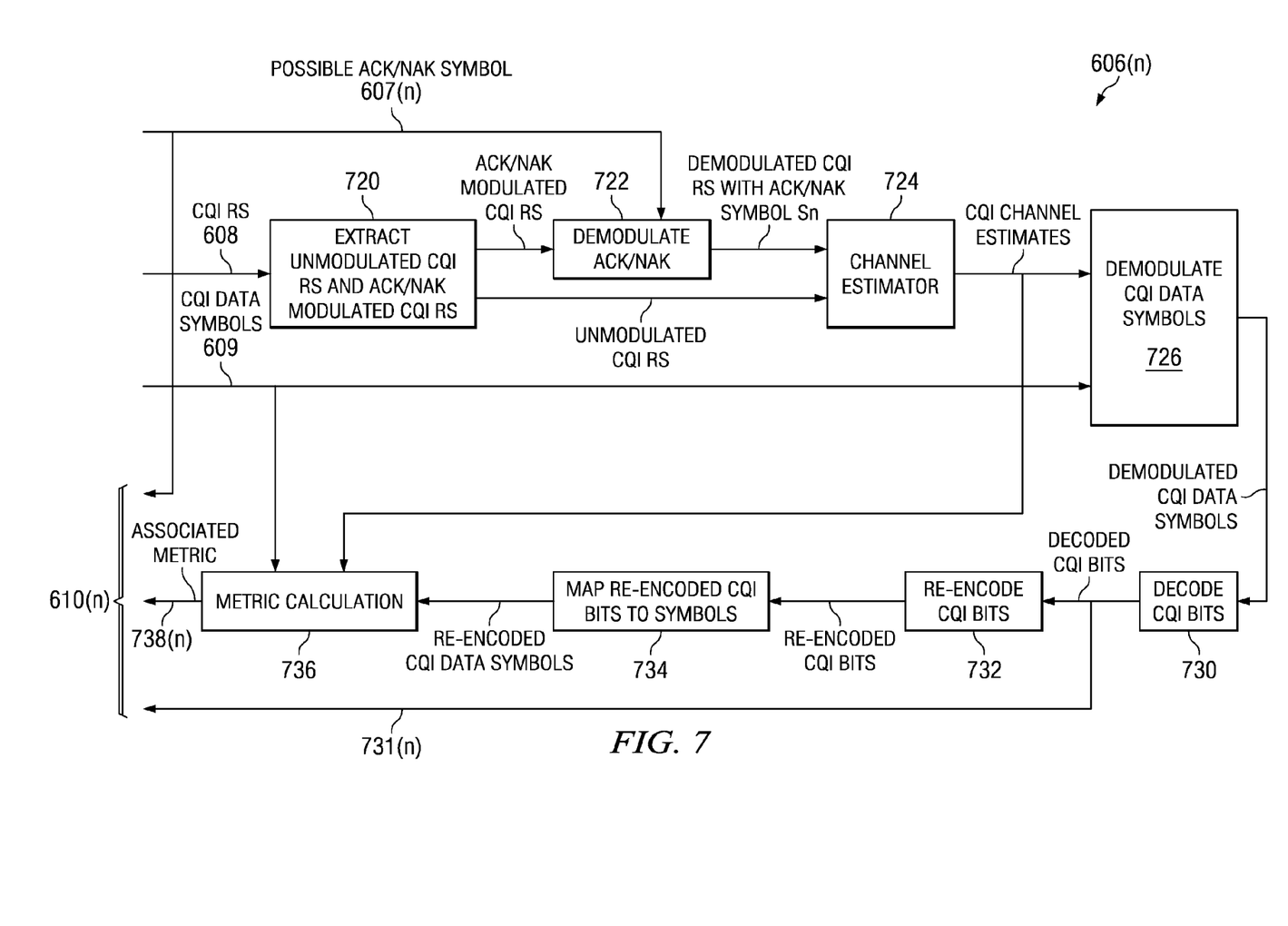
FIG. 7 is a more detailed block diagram of the decode blocks in FIG. 6.

FIG. 7 shows an exemplary implementation of decode block 606(n). The ACK/NAK modulated CQI RS and the unmodulated CQI RS are extracted from the CQI RS stream provided on input 608 by extractor block 720 using known techniques. The ACK/NAK modulated CQI RS is then demodulated with the assumed ACK/NAK symbol provided on input 607(n) by demodulation block 722 using known techniques to form a demodulated CQI RS. The demodulated CQI RS together with the un-modulated CQI RS are used to obtain channel estimates for all CQI data symbols by channel estimator block 724. The channel estimates for all CQI data symbols may be obtained by linearly interpolating the channel estimates on the CQI RS; however, other channel estimation methods are not precluded. Subsequently, the CQI data symbols 609 are demodulated by demodulator block 726 and decoded in decoder block 730 using known techniques to form decoded CQI bits 731. The decoded CQI bits are re-encoded in encoder block 732 and re-mapped to CQI data symbols in mapper block 734 to form re-encoded CQI data symbols. The re-encoded CQI data symbols are compared to the corresponding received CQI data symbol 609 to obtain a metric 738, which shows the confidence of the corresponding blind decoding branch. Metric 738(n), decoded CQI bit 731(n), and possible ACK/NAK symbol 607(n) together form output 610(n).

Each copy of decode block 606(n) generates an output 610(n) based on a unique possible ACK/NAK symbol provided on input 607(n).

Referring again to FIG. 6, metric comparison block 612 compares the metric 738(n) from each blind decoding branch provided by respective decode blocks 606(n) and selects the branch with the optimal metric. The corresponding decoded ACK/NAK bits 607(n) and CQI bits 731(n) provided as part of output 610(n) are then selected and output form comparison block 612 as the decoded ACK/NAK bit(s) and CQI information bits.

Referring again to FIG. 7, an exemplary implementation of the metric calculation block 736 is now described. Let $Q_n$ be the nth received CQI data symbol, $H_n$ be the obtained channel estimate for the nth CQI data symbol, and $W_n$ be the nth re-encoded CQI data symbol.

Then an example of the metric I is:

$$I = \sum_{n=1}^{N} |Q_n - H_n W_n|^2,$$

where the summation is carried over all N CQI data symbols. Other definitions for the metric are not precluded for other embodiments.

Simulation of this receiver structure has shown that with the described receiver structure in a high speed environment, embedding ACK/NAK in CQI RS as illustrated in FIG. 3 has better or similar CQI and ACK/NAK BLER (block error rate) than the joint approach as illustrated by FIG. 4. Thus, the structure of FIG. 3 may be used to reliably carry more uplink control information with ACK/NAK embedded in one of the RS than can be done with the structure of FIG. 4 in which ACK/NAK is jointly encoded with the CQI symbols.

System Examples

Figure 8:
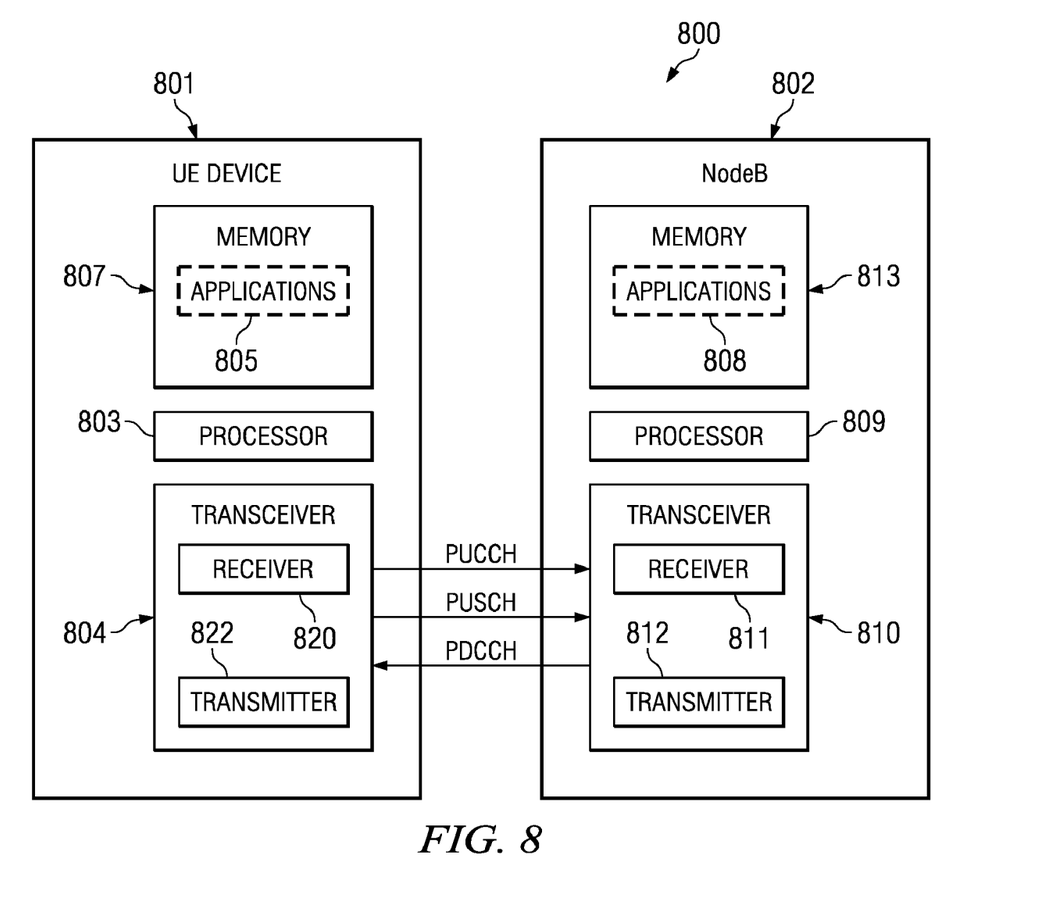
FIG. 8 is a block diagram of a Node B and a User Equipment for use in the network system of FIG. 1.

FIG. 8 is a block diagram illustrating operation of a NodeB and a mobile UE in the network system of FIG. 1. Wireless networking system 800 comprises a mobile UE device 801 in communication with NodeB 802. The mobile UE device 801 may represent any of a variety of devices such as a server, a desktop computer, a laptop computer, a cellular phone, a Personal Digital Assistant (PDA), a smart phone or other electronic devices. In some embodiments, the electronic mobile UE device 801 communicates with the NodeB 802 based on a LTE or E-UTRAN protocol. Alternatively, another communication protocol now known or later developed can be used.

As shown, the mobile UE device 801 comprises a processor 803 coupled to a memory 807 and a Transceiver 804. The memory 807 stores (software) applications 805 for execution by the processor 803. The applications 805 could comprise any known or future application useful for individuals or organizations. As an example, such applications 805 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 805, at least some of the applications 805 may direct the mobile UE device 801 to transmit UL signals to the NodeB (base-station) 802 periodically or continuously via the transceiver 804. In at least some embodiments, the mobile UE device 801 identifies a Quality of Service (QoS) requirement when requesting an uplink resource from the NodeB 802. In some cases, the QoS requirement may be implicitly derived by the NodeB 802 from the type of traffic supported by the mobile UE device 801. As an example, VOIP and gaming applications often involve low-latency uplink (UL) transmissions while High Throughput (HTP)/Hypertext Transmission Protocol (HTTP) traffic can involve high-latency uplink transmissions.

Transceiver 804 includes uplink logic which may be implemented by execution of instructions that control the operation of the transceiver. Some of these instructions may be stored in memory 807 and executed when needed. As would be understood by one of skill in the art, the components of the Uplink Logic may involve the physical (PHY) layer and/or the Media Access Control (MAC) layer of the transceiver 804. Transceiver 804 includes one or more receivers 820 and one or more transmitters 822. The transmitter is configured to optionally provide feedback to the NodeB as described in more detail above. In particular, as described above, a transmission signal comprises at least one data symbol and at least one RS symbol. An exemplary uplink feedback transmission signal comprising five data symbols and two RS symbols is shown in FIG. 2. ACK/NAK and CQI feedback information are embedded, as described above.

A pre-defined reference signal is transmitted in the RS symbol. The pre-defined reference signal transmitted in each RS symbol can be the same. Alternatively, the pre-defined reference signals can be different in different RS symbols, provided these pre-defined reference signals are known to both the transmitter and the receiver.

As shown in FIG. 8, the NodeB 802 comprises a Processor 809 coupled to a memory 813 and a transceiver 810. The memory 813 stores applications 808 for execution by the processor 809. The applications 808 could comprise any known or future application useful for managing wireless communications. At least some of the applications 808 may direct the base-station to manage transmissions to or from the user device 801.

Transceiver 810 comprises an uplink Resource Manager, which enables the NodeB 802 to selectively allocate uplink PUSCH resources to the user device 801. As would be understood by one of skill in the art, the components of the uplink resource manager may involve the physical (PHY) layer and/or the Media Access Control (MAC) layer of the transceiver 810. Transceiver 810 includes a Receiver 811 for receiving transmissions from various UE within range of the NodeB and transmitters 812 for transmitting data and control information to the various UE within range of the NodeB.

The uplink resource manager executes instructions that control the operation of transceiver 810. Some of these instructions may be located in memory 813 and executed when needed on processor 809. The resource manager controls the transmission resources allocated to each UE that is being served by NodeB 802 and broadcasts control information via the physical downlink control channel PDCCH.

Receiver 811 is embodied as described in more detail with respect to FIGS. 5-7. When provisioned in a cell that is designated as a low or medium speed cell, receiver 811 may be embodied according to FIG. 5. When provisioned in a cell that is designated as a high speed cell, receiver 811 may be embodied as according to FIGS. 6-7. Alternatively, NodeB 802 may determine the velocity of a UE and select a receiver configuration according to the velocity of the UE. For example, Doppler shifts can be determined for signals received from the UE and used to estimate the velocity of the UE.

Receiver 811 is embodied by executing instructions stored in memory 813 on processor 809 using generally known signal processing techniques. Various blocks of functional logic are implemented by executing instructions to perform the functions described with respect to FIGS. 5-7. Since the receivers are implemented in signal processing software, it is a simple matter to execute one set of instructions to embody the functional block of the receiver structure of FIG. 5 and to execute another set of instructions to embody the functional blocks of the receiver structure of FIGS. 6-7.

Receiver antenna and receiver radio frequency analog to digital circuitry (not shown) is connected for access by processor 809 so that the resulting received digital bit stream may be processed by the receiver signal processing code executed on processor 809.

It is to be understood that a given NodeB 802 may contain a potentially large number of processors 809 and memory 813 which operate in a parallel manner to embody a multitude of radio receivers for processing incoming digital data streams from all of the UE operating within the cell controlled by NodeB 802. Therefore, FIG. 8 is exemplary of the processor/memory systems within NodeB 802.

Other Embodiments

Various other embodiments of the invention will be apparent to persons skilled in the art upon reference to this description. For example, a larger or smaller number of symbols then described herein may be used in a slot. Other types of feedback may be separately embedded and transmitted in configured frames at various times. The term "frame" and "subframe" are not restricted to the structure of FIG. 2. Other configurations of frames and/or subframes may be embodied. In general, the term "frame" may refer to a set of one or more subframes. A transmission instance likewise refers to a frame, subframe, or other agreed upon quantity of transmission resource in which a feedback indication can be embedded.

In the embodiments described with respect to FIGS. 6-7, several assumed values of the first data stream (for example, ACKNAK) are used to generate a parallel set of metric values based on the second data stream that are then used to select a final decode result for the first data stream based on the which assumed value produced the more optimal metric value. In another embodiment, several assumed values of the second data stream (for example, CQI) may also be used to generate another parallel set of metric values based on the first data stream that are then used to select the final decode result for the second data stream based on which assumed values in the second data stream produces the more optimal metric values.

In one embodiment, there are five CQI symbols per slot that each represent two coded data bits (QPSK). ACKNAK information element can assume N values. CQI information element can assume M values, represented by log 2(M) bits. Consequently, ACKNAK and CQI combinations can assume N*M values. Thus, ACKNAK and CQI jointly form a codeword and there are N*M possible codewords. A metric comparison is then performed to pick an optimal metric which then indicates the correct codeword. For example, the argument of processing the received symbol signals with a conjugate of the assumed value of a transmitted symbol that provides the maximum value can indicate the decoded codeword, follows:

$$x_d = \underset{x \in X}{\mathrm{argmax}} \left( \sum_{n=1}^{Nr} \sum_{i=0}^{1} \left| \sum_{j=0}^{6} y(i,j,n) x'(i,j) \right|^2 \right)$$

where:
$x_d$ is the decoded codeword, including ACKNAK and CQI, and RS;
X is the set of all possible codewords x; There are M*N possible codewords.
$N_r$ is the number of Rx antennas;
I is the slot index, i=0, 1;
j is the OFDM symbol index, j=0, 1, ..., 6;
x(i,j) is the transmitted QPSK symbol on jth OFDM symbol in slot i
x(i,j)=1 for j=1 and 5, as DM RS;
y(i,j,n) is the received signal on jth OFDM symbol in slot i on nth Rx antenna.

In another embodiment, a subset of the five CQI symbols may be decoded using parallel decoder blocks to produce a set of metrics. For example, two CQI symbols comprising four CQI data bits would require 2*16 (thirty-two) decoder blocks. Similarly, three symbols would require 128 decoder blocks. A metric comparison is then performed to pick optimal metric which then indicates the correct decode value selected symbols and the resulting channel estimate can then be used to demodulate the remaining symbols.

Channel Quality Information can be also designated as Channel Quality Index or any other equivalent term.

While the disclosure has discussed a PMI, and MCS feedback scheme, the described principle can be generalized for joint decoding of any two individual data streams. In these generalizations, ACK/NAK represents one data stream, and CQI represents another data stream. Thus, the described transmission structures were exemplary.

In some embodiments of the invention, an information element is a two-state (binary) quantity (i.e. a bit). In other embodiments, an information element can be a quantity which assumes more than two states. Different information elements need not necessarily have the same number of states. ACNKAK is an information element. CQI is an information element.

While the processing circuitry to embody the receiver structures of FIGS. 5-7 described herein is generally embodied by signal processing software executed on a processor core coupled to memory holding the signal processing instructions, other embodiments may embody some or all of the processing blocks in dedicated special purpose hardware, or in a combination of hardware and software.

As used herein, the terms "applied," "coupled," "connected," and "connection" mean electrically connected, including where additional elements may be in the electrical connection path. "Associated" means a controlling relationship, such as a memory resource that is controlled by an associated port. While the invention has been described with reference to illustrative embodiments, this description is not intended to be construed in a limiting sense. A receiver for high-speed environment can be used uniformly: i.e. for both high and low speed users. Thus, such receiver accomplishes a uniform design.

It is therefore contemplated that the appended claims will cover any such modifications of the embodiments as fall within the true scope and spirit of the invention.

What is claimed is:

1. A method for detecting at least two elements of transmitted uplink control information (UCI); comprising:
   receiving a first set of symbols produced using a first information element;
   receiving a second set of symbols produced using a second information element;
   producing at least a first metric using the first set and the second set of received symbols; and
   detecting the first information element using the first metric;
   wherein the first information element is an acknowledgement (ACK/NAK), the second information element is channel quality information (CQI), and wherein producing the first metric further comprises:
   decoding the CQI using a hypothesized first value for the ACK/NAK;
   re-encoding the decoded CQI; and
   using the re-encoded CQI and the received CQI to produce the first metric.

2. A method for detecting at least two elements of transmitted uplink control information (UCI); comprising:
   receiving a first set of symbols produced using a first information element;
   receiving a second set of symbols produced using a second information element;
   producing at least a first metric using the first set and the second set of received symbols; and
   detecting the first information element using the first metric;
   producing at least a second metric using the first set and the second set of received symbols;
   wherein the first metric is produced using a hypothesized first value for the first information element;
   wherein the second metric is produced using a hypothesized second value for the first information element; and
   wherein detecting the first information element comprises comparing the at least first metric and the at least second metric;
   producing at least a third metric using the first set and the second set of received symbols, wherein the third metric is produced using a hypothesized first value for the second information element;
   producing at least a fourth metric using the first set and the second set of received symbols, wherein the fourth metric is produced using a hypothesized second value for the second information element; and
   wherein detecting the first information element further comprises comparing the at least third metric and the at least fourth metric.

3. The method of claim 1, further comprising producing at least a second metric using the first set and the second set of received symbols by decoding the CQI using a hypothesized second value for the ACK/NAK.

4. A method for detection of acknowledgement feedback (ACK/NAK) and channel quality indication (CQI) in a wireless network, comprising:
   receiving a transmission instance comprising CQI symbols and an ACK/NAK modulated reference signal (RS);
   producing a first metric by decoding a CQI symbol to form a first version of a decoded CQI bit using an assumed ACK/NAK element having a first value;
   producing a second metric by decoding the CQI symbol to form a second version of the decoded CQI bit using an assumed ACK/NAK element having a second value; and
   selecting a version of the decoded ACK/NAK bit having an optimal metric by comparing the first and the second metric.

5. The method of claim 4, wherein producing the first metric further comprised re-encoding the first version of the decoded CQI bit to form a first re-encoded CQI symbol, and using the first re-encoded CQI symbol and the received CQI symbol to produce the first metric.

6. The method of claim 5, wherein producing the second metric further comprised re-encoding the second version of the decoded CQI bit to form a second re-encoded CQI symbol, and using the second re-encoded CQI symbol and the received CQI symbol to produce the second metric.

7. An apparatus for receiving in a wireless network, comprising:
   processing circuitry coupled to a memory and to receiving circuitry;
   the receiving circuitry being operable to receive a first set of symbols produced using a first information element and a second set of symbols produced using a second information element; and
   the processing circuitry operable to produce at least a first metric using the first set and the second set of received symbols, and to detect the first information element using the first metric;

wherein the processing circuitry is further operable to produce at least a second metric using the first set and the second set of received symbols;

wherein the first metric is produced using a hypothesized first value for the first information element;

wherein the second metric is produced using a hypothesized second value for the first information element; and wherein detecting the first information element comprises comparing the at least first metric and the at least second metric;

wherein the first information element is an acknowledgement (ACK/NAK), the second information element is channel quality information (CQI), and wherein the processing circuitry is further operable to produce the first metric by:

decoding the CQI using a hypothesized first value for the ACK/NAK;

re-encoding the decoded CQI; and using the re-encoded CQI and the received CQI to produce the first metric.

8. The apparatus of claim 7, being a base station, and wherein the processing circuitry comprises a processor operable to execute instructions stored in the memory.

\* \* \* \* \*